United States Patent
Ito et al.

(10) Patent No.: US 6,663,928 B2
(45) Date of Patent: Dec. 16, 2003

(54) HEAT-SHRINKABLE POLYESTER FILMS AND LABELS USING THE SAME

(75) Inventors: Hideki Ito, Inuyama (JP); Norimi Tabota, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/055,020

(22) Filed: Jan. 25, 2002

(65) Prior Publication Data

US 2002/0150780 A1 Oct. 17, 2002

(30) Foreign Application Priority Data

| Jan. 25, 2001 | (JP) | ........................ 2001-017376 |
| Mar. 9, 2001 | (JP) | ........................ 2001-067368 |
| Apr. 5, 2001 | (JP) | ........................ 2001-107267 |
| Apr. 6, 2001 | (JP) | ........................ 2001-109026 |
| Apr. 6, 2001 | (JP) | ........................ 2001-109028 |

(51) Int. Cl.[7] .................... B32B 27/00; B32B 27/36
(52) U.S. Cl. .................... 428/35.1; 428/34.9; 428/480; 525/437; 525/444; 528/308
(58) Field of Search ............... 428/35.1, 34.9, 428/480, 910; 525/419, 420, 425, 437, 444; 528/308

(56) References Cited

U.S. PATENT DOCUMENTS

| 5,932,685 | A | * | 8/1999 | Mori et al. ............. 528/272 |
| 6,342,281 | B2 | * | 1/2002 | Hayakawa et al. ......... 428/347 |
| 6,383,627 | B2 | * | 5/2002 | Hashimoto et al. ........ 428/332 |
| 6,447,925 | B1 | * | 9/2002 | Tabota et al. ............. 428/327 |
| 6,451,445 | B1 | * | 9/2002 | Ito et al. ................ 428/480 |
| 6,458,437 | B1 | * | 10/2002 | Ito et al. ................ 428/35.1 |
| 6,465,063 | B1 | * | 10/2002 | Hayakawa et al. ........ 428/35.1 |

FOREIGN PATENT DOCUMENTS

| EP | 0 826 482 A2 | * | 3/1998 |
| EP | 0 934 813 A2 | | 8/1999 |
| EP | 1 024 162 A2 | | 8/2000 |
| EP | 1 055 506 A1 | | 11/2000 |
| JP | 03-200543 A | * | 9/1991 |
| JP | 09-239833 A | * | 9/1997 |
| JP | 10-077335 A | * | 3/1998 |
| JP | 2000-135738 | * | 5/2000 |
| JP | 2000-167928 A | * | 6/2000 |
| JP | 2000-169601 | * | 6/2000 |

* cited by examiner

*Primary Examiner*—Vivian Chen

(57) ABSTRACT

Heat-shrinkable polyester films, each having a heat shrinkability of 5–60% after treatment in hot water at 70° C. for 5 seconds and 65–95% after treatment in hot water at 85° C. for 5 seconds, both in the main shrinkage direction of the film, and 10% or lower after treatment in hot water at 85° C. for 5 seconds in a direction perpendicular to the main shrinkage direction of the film, the heat-shrinkage stress in the main shrinkage direction of the film being 13 MPa or smaller, and the film haze being lower than 10%, exhibits excellent shrinkage finish in appearance with only rare occurrence of wrinkles, shrinkage spots and strains by shrinkage; therefore, these films are suitable for full labels on bottles, particularly for full labels on PET bottles.

4 Claims, No Drawings

HEAT-SHRINKABLE POLYESTER FILMS AND LABELS USING THE SAME

FIELD OF INVENTION

The present invention relates to heat-shrinkable polyester films and particularly to heat-shrinkable polyester films suitable for label use. More specifically, it relates to heat-shrinkable polyester films for full labels on bottles, particularly for full labels on polyethylene terephthalate (PET) bottles, which will cause only rare occurrence of wrinkles, shrinkage spots and strains by heat shrinkage.

BACKGROUND OF THE INVENTION

For heat-shrinkable films, particularly heat-shrinkable films for labels on the barrels of bottles, there have mainly been used films made of polyvinyl chloride, polystyrene or other resins. However, for polyvinyl chloride, the evolution of a chlorine-containing gas in its incineration for disposal has become a problem, and for polyethylene, there is a problem that printing is difficult. Further, in the collection and recycling of PET bottles, labels of resins other than PET, such as polyvinyl chloride or polyethylene, should be separated. Therefore, attention has been paid to heat-shrinkable polyester films involving these problems.

In recent years, for recycling of PET bottles, colored bottles are not suitable for reuse, and therefore, many alternative plans have been studied. Among them is a method of using a non-colored bottle and allowing a colored label to shrink over the bottle.

However, when used as full labels on bottles, the conventional heat-shrinkable films may sometimes cause a problem in shrinkage finish. In the case of full labels on narrow-mouthed bottles having a large difference in bottle diameter between the mouths and the barrels, particularly such as beverage bottles, the conventional heat-shrinkable films exhibit insufficient shrinkage at the upper neck portions of the bottles. The heat-shrinkable films to be used for full labels on such bottles should have heat-shrinkage characteristics such as high shrinkability.

Thus in the case of full label use on bottles, the conventional heat-shrinkable films have insufficient performance.

For example, the films disclosed in JP 2000-169601 A exhibit high shrinkage, but have not yet reached a level requiring shrinkage finish.

SUMMARY OF THE INVENTION

The present invention, which can solve the above problems, has been made for the purpose of providing heat-shrinkable polyester films for full labels on bottles, particularly for full labels on PET bottles, which films are particularly used for full labels on PET bottles requiring excellent finish in appearance and will cause only rare occurrence of wrinkles, shrinkage spots and strains by shrinkage.

Thus the present invention is directed to heat-shrinkable polyester films, each having a heat shrinkability of 5–60% after treatment in hot water at 70° C. for 5 seconds and 65–95% after treatment in hot water at 85° C. for 5 seconds, both in the main shrinkage direction of the film, and 10% or lower after treatment in hot water at 85° C. for 5 seconds in a direction perpendicular to the main shrinkage direction of the film, the heat-shrinkage stress in the main shrinkage direction of the film being 13 MPa or smaller, and the film haze being lower than 10%, thereby attaining the above purpose.

DETAILED DESCRIPTION OF THE INVENTION

The dicarboxylic acid components constituting polyesters used in the present invention may include aromatic dicarboxylic acids such as terephthalic acid, isophthalic acid, naphthalenedicarboxylic acid and o-phthalic acid; aliphatic dicarboxylic acids such as adipic acid, azelaic acid, sebacic acid and decanedicarboxylic acid; and alicyclic dicarboxylic acids.

When aliphatic dicarboxylic acids (e.g., adipic acid, sebacic acid, decanedicarboxylic acid) are contained, their contents may preferably be lower than 3 mol %. For heat-shrinkable polyester films obtained by the use of polyesters containing these aliphatic dicarboxylic acids at 3 mol % or higher, their film stiffness in the high-speed fitting is insufficient.

The polyesters may preferably contain no three or more functional polycarboxylic acids (e.g., trimellitic acid, pyromellitic acid, their anhydrides). For heat-shrinkable polyester films obtained by the use of polyesters containing these polycarboxylic acids, their desired high shrinkability can hardly be attained.

The diol components constituting the polyesters used in the present invention may include aliphatic diols such as ethylene glycol, propanediol, butanediol, neopentyl glycol and hexanediol; alicyclic diols such as 1,4-cyclohexanedimethanol; and aromatic diols.

The polyesters used in the heat-shrinkable polyester films of the present invention may preferably be those having glass transition temperatures (Tgs) adjusted to 60–75° C. by the incorporation of at least one diol of 3–6 carbon atoms (e.g., propanediol, butanediol, neopentyl glycol, hexanediol).

For the purpose of obtaining heat-shrinkable polyester films exhibiting particularly excellent shrinkage finish, neopentyl glycol may preferably be used as one of the diol components.

The polyesters may preferably contain neither diols of 8 or more carbon atoms (e.g., octanediol), nor three or more functional polyhydric alcohols (e.g., trimethylolpropane, trimethylolethane, glycerin, diglycerin). For heat-shrinkable polyester films obtained by the use of polyesters containing these diols or polycarboxylic acids, their desired high shrinkability can hardly be attained.

The polyesters may preferably contain none of diethylene glycol, triethylene glycol, and polyethylene glycol, if possible. In particular, diethylene glycol may easily be formed as a by-product component in the polymerization of polyesters and therefore may easily be contained in the polyesters. For the polyesters used in the present invention, the diethylene glycol contents may preferably be lower than 4 mol %.

For the heat-shrinkable films of the present invention, polyesters meeting the above conditions may be used alone, or two or more such polyesters may be used in admixture.

When two or more polyesters are used in admixture, the acid component contents and the diol component contents of the mixed polyesters refer to the contents, relative to the total amount of all acid components and the total amount of all diol components, respectively, both of which are contained in the mixed polyesters, independently of whether or not transesterification has been carried out after the mixing.

The mode for using two or more polyesters in admixture may include, for example, the following cases:

1. PET/copolymerized PES
2. copolymerized PES/copolymerized PES
3. PET/copolymerized PES/copolymerized PES Further, to improve the self-lubricating properties of heat-shrinkable polyester films, inorganic lubricants such as titanium dioxide, fumed silica, kaolin and calcium carbonate; or organic lubricants such as long-chain fatty acid esters may preferably be added. The heat-shrinkable polyester films of the present invention may further contain, if necessary, additives such as stabilizers, colorants, antioxidants, defoamers, antistatic agents and ultra-violet light absorbers.

For the heat-shrinkable polyester films of the present invention, amorphous polyesters may preferably be incorporated to attain high shrinkability. In addition to amorphous polyesters, polyester elastomers may preferably be incorporated at 5–24 wt %, more preferably at 10–24 wt %, still more preferably at 15–24 wt %, and particularly preferably 17–24 wt %. When the amounts of polyester elastomers are lower than 5 wt %, low temperature shrinkability is hardly expressed, and therefore, failures in shrinkage, such as wrinkles, will easily occur. In contrast, when the amounts of polyester elastomers are higher than 24 wt %, high shrinkability is hardly expressed, and therefore, failures in shrinkage, such as insufficient shrinkage at the necks of bottles, will easily occur.

Further, it has also been found that shrinkage stress in the shrinkage by heating may easily be reduced by the incorporation of polyester elastomers. Not too great amounts of amorphous polyesters incorporated bring about an easy reduction of shrinkage stress in the shrinkage by heating.

The polyester elastomers used in the present invention refer to polyester block copolymers composed of constituent units as follows: high melting point crystalline polyester segments (hard segments) and low melting point soft polymer segments having molecular weights of 400 or higher (soft segments) wherein the melting points of high molecular weight polymers formed only by high melting point crystalline polyester segment constituent components are 200° C. or higher and the melting points or softening points when measured only for the low melting point soft polymer segment constituent components are 80° C. or lower.

The high melting point crystalline polyester segment constituent components exhibit melting points of 200° C. or higher when fiber forming high molecular weight polymers are formed from these constituent components. Examples thereof may include polyester segments composed of residues of aromatic dicarboxylic acids such as terephthalic acid, isophthalic acid, 1,5-naphthalenedicarboxylix acid and 2,6-naphthalenedicarboxylic acid; and residues of aliphatic, aromatic or alicyclic diols such as ethylene glycol, propylene glycol, tetramethylene glycol, pentamethylene glycol, 2,2-dimethyltrimethylene glycol, hexamethylene glycol, decamethylene glycol, p-xylene glycol and cyclohexanedimethanol.

There can also be mentioned copolymerized polyester segments using two or more acids as described above and/or two or more glycols as described above.

The low melting point soft polymer segment constituent components having molecular weights of 400 or higher refer to those which exhibit a substantially amorphous state among the polyester block copolymers and have melting points or softening points of 80° C. or lower when measured only for these segment constituent components. Their molecular weights may usually be 400–8000, preferably 700–5000.

The ratios of low melting point soft polymer segment constituent components in the polyester block copolymers may preferably be 5–80 wt %. Particularly preferred ratio is 15–50 wt %.

For the low melting point soft polymer segment constituent components used in the present invention, particularly preferred are polymers of cyclic esters such as poly-ε-caprolactone. Further preferred are those which contain polybutylene terephthalate components.

The above polyesters can be prepared by polymerization according to the conventional methods; for example, the polyesters can be obtained direct esterification method in which dicarboxylic acids are directly reacted with diols or transesterification method in which dicarboxylic acid dimethyl esters are reacted with diols. The polymerization may be carried out in either of batch or continuous manner.

For the heat-shrinkable polyester films of the present invention, the heat shrinkability as calculated from the values of side length before and after shrinkage by treatment in hot water under no load according to the equation: heat shrinkability=((side length before shrinkage−side length after shrinkage)/side length before shrinkage)×100 (%) should be 5–60%, preferably 5–50%, and more preferably 10–30%, after treatment in hot water at 70° C. for 5 seconds, and 65–95%, preferably 65–75%, and more preferably 65–70% after treatment in hot water at 85° C. for 5 seconds, both in the main shrinkage direction of a film, and 10% or lower, preferably 6% or lower, after treatment in hot water at 85° C. for 5 seconds, in a direction perpendicular to the main shrinkage direction of the film.

When the heat shrinkability in the main shrinkage direction of a film is lower than 5% after treatment in hot water at 70° C. for 5 seconds, labels made of such a film exhibit insufficient shrinkage at low temperatures, requiring the rise in temperature for shrinkage, which is not preferred. In contrast, when the heat shrinkability is higher than 60%, labels made of such a film cause jumping by heat shrinkage, which is also not preferred.

As described above, the heat shrinkability in the main shrinkage direction of a film should be 65–95% after treatment in hot water at 85° C. for 5 seconds. When the heat shrinkability is lower than 65%, labels made of such a film cause insufficient shrinkage at the mouth portions of bottles, which is not preferred. In contrast, when the heat shrinkability is higher than 95%, labels made of such a film have a possibility of causing jumping because of their still having shrinkability after heat shrinkage, which is also not preferred.

The heat shrinkage stress in the main shrinkage direction of a film should be 13 MPa or smaller at 90° C. This is because the present inventors have extensively studied and then found that there is a correlation between the heat shrinkage stress and the shrinkage finish. In other words, this seems because if the shrinkage stress is low, shrinkage gradually occurs and the film uniformly shrinks in each portion. The heat shrinkage stress in the main shrinkage direction of a film may preferably be 10 MPa or smaller. When the heat shrinkage stress is larger than 13 MPa, labels made of such a film easily cause jumping, strains and other defects by heat shrinkage, which is not preferred.

For adjusting the heat shrinkage stress in the main shrinkage direction of a film to 13 MPa or smaller at 90° C. in this manner, it is preferable, for example, that the film is not so much stretched at a high ratio. At this time, if the film does not stretched at so higher temperatures, higher shrinkability can be obtained. Further, setting lower a glass transition temperature of a heat shrinkable film is preferred for obtaining shrinkability at low temperatures.

The difference of heat shrinkability (ΔHS) in the main shrinkage direction of a film between after treatment in hot water at 80° C. for 5 seconds and after treatment in hot water at 70° C. for 5 seconds may preferably be 60% or smaller, more preferably 55% or smaller. When the difference of heat shrinkability is smaller than 60%, rapid heat shrinkage hardly occurs, so that labels made of such a film cause only rare occurrence of the wrinkles, shrinkage spots, strains and other defects by heat shrinkage.

For the heat-shrinkable polyester films of the present invention, the film thickness is not particularly limited, but may preferably be 10–200 μm, more preferably 20–100 μm, as the heat-shrinkable films for labels.

The films may preferably have a haze of lower than 10%, more preferably lower than 9%. When the film haze is lower than 10%, the coloring of labels after printing is improved, which is preferred.

The process for producing the heat-shrinkable polyester films of the present invention will be explained below by a specific example; however, it is not limited to this example.

The polyester raw materials used in the present invention are dried with a dryer such as a hopper dryer or a paddle dryer, or a vacuum dryer, and melt extruded into a film shape at a temperature of 200–300° C. In the extrusion, any of the conventional methods may be employed, including T-die method and tubular method. After the extrusion, rapid cooling provides an unstretched film.

The resulting unstretched film is then stretched at a ratio of 3.0 or higher, preferably 3.5 or higher, in the transverse direction (i.e., the direction perpendicular to the direction of extrusion) at a temperature of (Tg–5° C.) or higher but lower than (Tg+15° C.). Stretching at a temperature of Tg or higher but lower than (Tg+10° C.) is preferred in that both high shrinkability and low shrinkage stress are attained.

When stretching is carried out at a temperature of lower than (Tg–5° C.), the values of heat shrinkability as the claimed conditions in the present invention can hardly be obtained and the resulting film has deteriorated transparency, which is not preferred.

When stretching is carried out at a temperature of (Tg+15° C.) or higher, the resulting film has insufficient film stiffness for high-speed fitting and remarkably deteriorated thickness distribution, which is not preferred.

The stretched film is then heat treated, if necessary, at a temperature of 65–100° C. to give a heat-shrinkable polyester film.

The method of stretching may involve uniaxial stretching only in the transverse direction (TD) with a tenter, in which case the film can additionally be stretched in the machine direction (MD) to attain biaxial stretching. Such biaxial stretching may be achieved by any of the sequential or simultaneous biaxial stretching method, and the film may further be stretched, if necessary, in the machine or transverse direction.

For attaining the purpose of the present invention, the transverse direction (i.e., the direction perpendicular to the direction of extrusion) is practical as the main shrinkage direction of a film; therefore, the above explanation is for an example of the film formation when the main shrinkage direction of the film is taken as the transverse direction. However, the film formation in which the main shrinkage direction of the film is taken as the machine direction (i.e., the direction of extrusion) can also be carried out substantially in the same manner as described above, except that the direction of stretching is turned 90 degrees around the line perpendicular to the film surface.

For the heat-shrinkable polyester films of the present invention, the thickness distribution of a film as calculated from the values of film thickness by the following equation:

$$\text{Thickness distribution} = \frac{\text{Maximum thickness} - \text{Minimum thickness}}{\text{Average thickness}} \times 100 \ (\%)$$

may preferably be 6% or lower, more preferably 5% or lower.

The films having a thickness distribution of 6% or lower are easy to achieve the superposition of colors in the three-color printing carried out, for example, in the evaluation of shrinkage finish, whereas the films having a thickness distribution of higher than 6% are not preferred from the viewpoint of color superposition.

To make even thickness distribution in the heat-shrinkable polyester films of the present invention, an unstretched film may preferably be heated to a prescribed film temperature at a low air flow rate with a heat transmission coefficient of 0.0013 cal/cm²·sec·° C. (0.0054 J/cm²·sec·K) or lower in the step of preheating to be carried out prior to the step of stretching when stretched in the transverse direction with a tenter.

In this case, preheating at an air flow rate of 12–16 m/sec through a nozzle is preferred even for a decrease in haze.

The equipment for preheating an unstretched film may include, for example, equipment provided with an inverter for controlling the flow rate of hot air to heat the film, making it possible to prevent a change in the air flow rate; and equipment using low-pressure steam at a pressure of 50 kPa or lower (5 kgf/cm² or lower) as the heat source, making it possible to prevent a change in the temperature of hot air.

To prevent the internal heat evolution of a film involved in stretching to reduce the unevenness of film temperature in the width direction, the step of stretching may preferably be conditioned with a heat transmission coefficient of 0.0009 cal/cm²·sec·° C. (0.0038 J/cm²·sec·K) or higher, more preferably 0.0011–0.0017 cal/cm²·sec·° C. (0.0046–0.0072 J/cm²·sec·K).

When the air flow rate employed in the step of preheating corresponds to a heat transmission coefficient of higher than 0.0013 cal/cm²·sec·° C. (0.0054 J/cm²·sec·K) or when the air flow rate employed in the step of stretching corresponds to a heat transmission coefficient of lower than 0.0009 cal/cm²·sec·° C. (0.0038 J/cm²·sec·K), the film thus obtained is difficult to have even thickness distribution, so that it causes the deviation of patterns in the superposition of many colors when processed in the multi-color printing, which is not preferred.

EXAMPLES

The present invention will hereinafter be further illustrated by some examples and comparative examples; however, the present invention is not limited to these examples.

The heat-shrinkable polyester films of the present invention were evaluated by the following methods.

(1) Heat shrinkability

A film was cut into a square shape of 10 cm×10 cm with two sides parallel to the machine direction and to the transverse direction, respectively. This sample was heat shrunk by immersion under no load in hot water at a prescribed temperature ±0.5° C. for a prescribed time and then measured for side lengths in the machine direction and in the transverse direction, respectively. The heat shrinkability was calculated in the respective directions from the measured values of side lengths by the following equation. The direction of either side corresponding to the larger value of heat shrinkability was referred to as the main shrinkage direction.

$$\text{Heat shrinkability} = \frac{\text{Side length before shrinkage} - \text{Side length after shrinkage}}{\text{Side length before shrinkage}} \times 100 \ (\%)$$

(2) Shrinkage stress

A tensilon (with a heating furnace) strength and elongation measuring machine available from Toyo Seiki Co., Ltd. was used, and a sample of 200 mm in length along the main shrinkage direction and 20 mm in width was cut out from a heat-shrinkable film. The distance between the chucks was 100 mm, and ventilation was stopped in an atmosphere having previously heated to 90°C. and the sample was fitted between the chucks. Then, the door of the furnace was immediately shut and ventilation was resumed, at which time stress found occurring was measured and the maximum value determined from the chart was regarded as heat shrinkage stress (MPa).

(3) Film haze

According to JIS K 7136, a film was measured for film haze with a hazemeter, model 1001DP, available from NIPPON DENSHOKU INDUSTRIES CO., LTD.

(4) Shrinkage finish

A film was printed with three inks of glass, gold and white colors, and cut into a rectangular shape of 221 mm in width along the main shrinkage direction and 50 mm in height along the direction perpendicular thereto. This sample was formed into a cylindrical label of 50 mm in height and 108 mm in folding diameter (i.e., length in the width direction when the label was folded flat) by attaching one end to the other in the main shrinkage direction (the width of margins for attachment was 5 mm) with 1,3-dioxolane. The label was fitted on a 500-mL PET bottle (20.6 cm in height and 6.5 cm in barrel diameter; the same bottle as manufactured by YOSHINO KOGYOSHO K.K. and used for "Afternoon Tea" from KIRIN BEVERAGE), and heat shrunk by allowing the labeled PET bottle to pass through a steam tunnel (model SH-1500-L) available from FUJI ASTEC, INC., at a zone temperature of 90° C. for a passage time of 2.5 seconds. This testing was carried out for 20 different samples of each film. The shrinkage finish was determined by visual observation and evaluated at 2 ranks on the following criteria:

Good: none of wrinkles, jumping, and insufficient shrinkage were observed;

Poor: wrinkles, jumping, or insufficient shrinkage were observed.

(5) Glass transition temperature (Tg)

Using a differential scanning calorimeter (model DSC220) available from SEIKO INSTRUMENTS & ELECTRONICS LIMITED, an unstretched film of 10 mg in weight was heated from −40° C. to 120° C. at a heating rate of 20° C./min. to draw a heat absorption curve, from which the glass transition temperature (Tg) was determined. Two tangent lines were drawn before and after the inflection point on the heat absorption curve, and the point of their intersection was regarded as the glass transition temperature (Tg).

(6) Thickness distribution

A film was cut in a size of 5 cm×50 cm along the machine direction and along the transverse direction, respectively. This sample was measured for thickness (the number of measured points=20) with a contact thickness meter (model KG60/A) available from ANRITSU CORPORATION. For each sample, the thickness distribution (i.e., scattering of thickness) was calculated by the following equation. The mean value of thickness distribution (n=50) was determined and evaluated on the following criteria:

$$\text{Thickness distribution} = \frac{\text{Maximum thickness} - \text{Minimum thickness}}{\text{Average thickness}} \times 100 \ (\%)$$

Good: 6% or lower

Fair: higher than 6% but lower than 10%

Poor: 10% or higher (7) Intrinsic viscosity

A sample of 200 mg in weight was added to a mixture of phenol and tetrachloroethane (50:50 wt %) in 20 ml, and the mixture was then heated at 110° C. for 1 hour, followed by measurement of intrinsic viscosity at 30° C. with an Ostwald's viscometer.

The polyesters used in the examples and comparative examples were as follows:

Polyester A: polyethylene terephthalate (intrinsic viscosity (IV), 0.75 dl/g)

Polyester B: a polyester composed of ethylene glycol at 70 mol % and neopentyl glycol at 30 mol % and terephthalic acid (IV, 0.72 dl/g)

Polyester C: a polyester elastomer composed of polybutylene terephthalate at 70 wt % and ε-caprolactone at 30 wt % (IV, 1.30 dl/g)

Polyester D: polybutylene terephthalate (IV, 1.20 dl/g)

Example 1

Polyesters A, B and C shown in Table 1 were mixed at 15, 65 and 20 wt %, respectively, and melt extruded from a T-die at 280° C., followed by rapid cooling on chill rolls, to give an unstretched film. The unstretched film had a Tg of 60° C.

The above unstretched film was pre-heated until the film temperature came to 73° C., and then stretched at a ratio of 5 in the transverse direction with a tenter at 65° C. to give a heat-shrinkable polyester film of 50 μm in thickness.

The heat transmission coefficients in the pre-heating step and in the stretching step were set to 0.0011 cal/cm$^2$·sec·° C. (0.0046 J/cm$^2$·sec·K) and 0.0012 cal/cm$^2$·sec·° C. (0.0050 J/cm$^2$·sec·K), respectively.

Example 2

Polyesters A, B and C shown in Table 1 were mixed at 15, 70 and 15 wt %, respectively, and melt extruded from a T-die at 280° C., followed by rapid cooling on chill rolls, to give an unstretched film. The unstretched film had a Tg of 63° C.

The above unstretched film was pre-heated until the film temperature came to 79° C., and then stretched at a ratio of 5 in the transverse direction with a tenter at 68° C. to give a heat-shrinkable polyester film of 50 μm in thickness.

The heat transmission coefficients in the pre-heating step and in the stretching step were set to 0.0011 cal/cm$^2$·sec·° C. (0.0046 J/cm$^2$·sec·K) and 0.0012 cal/cm$^2$·sec·° C. (0.0050 J/cm$^2$·sec·K), respectively.

Example 3

Polyesters A, B and C shown in Table 1 were mixed at 15, 75 and 10 wt %, respectively, and melt extruded from a T-die at 280° C., followed by rapid cooling on chill rolls, to give an unstretched film. The unstretched film had a Tg of 65° C.

The above unstretched film was pre-heated until the film temperature came to 83° C., and then stretched at a ratio of 5 in the transverse direction with a tenter at 72° C. to give a heat-shrinkable polyester film of 50 μm in thickness.

The heat transmission coefficients in the pre-heating step and in the stretching step were set to 0.0011 cal/cm$^2$·sec·° C. (0.0046 J/cm$^2$·sec·K) and 0.0012 cal/cm$^2$·sec·° C. (0.0050 J/cm$^2$·sec·K), respectively.

Example 4

Polyesters A, B and D shown in Table 1 were mixed at 15, 75 and 10 wt %, respectively, and melt extruded from a T-die at 280° C., followed by rapid cooling on chill rolls, to give an unstretched film. The unstretched film had a Tg of 69° C.

The above unstretched film was pre-heated until the film temperature came to 83° C., and then stretched at a ratio of 5 in the transverse direction with a tenter at 73° C. to give a heat-shrinkable polyester film of 50 μm in thickness.

The heat transmission coefficients in the pre-heating step and in the stretching step were set to 0.0011 cal/cm$^2$·sec·° C. (0.0046 J/cm$^2$·sec·K) and 0.0012 cal/cm$^2$·sec·° C. (0.0050 J/cm$^2$·sec·K), respectively.

Example 5

Polyesters A, B and D shown in Table 1 were mixed at 10, 80 and 10 wt %, respectively, and melt extruded from a T-die at 280° C., followed by rapid cooling on chill rolls, to give an unstretched film. The unstretched film had a Tg of 65° C.

The above unstretched film was pre-heated until the film temperature came to 83° C., and then stretched at a ratio of 5 in the transverse direction with a tenter at 72° C. to give a heat-shrinkable polyester film of 50 μm in thickness.

The heat transmission coefficients in the pre-heating step and in the stretching step were set to 0.0011 cal/cm$^2$·sec·° C. (0.0046 J/cm$^2$·sec·K) and 0.0012 cal/cm$^2$·sec·° C. (0.0050 J/cm$^2$·sec·K), respectively.

Comparative Example 1

A heat-shrinkable polyester film of 50 μm in thickness was obtained in the same manner as described in Example 1, except that the stretching temperature was set to 75° C.

Comparative Example 2

A film formation was carried out in the same manner as described in Example 1, except that the stretching temperature was set to 55° C. The film became whitened over the whole width at the outlet of the tenter.

Comparative Example 3

Polyesters A, B and C shown in Table 1 were mixed at 10, 60 and 30 wt %, respectively, and melt extruded from a T-die at 280° C., followed by rapid cooling on chill rolls, to give an unstretched film. The unstretched film had a Tg of 52° C.

The above unstretched film was pre-heated until the film temperature came to 65° C., and then stretched at a ratio of 5 in the transverse direction with a tenter at 61° C. to give a heat-shrinkable polyester film of 50 μm in thickness.

Comparative Example 4

Polyesters A, B and C shown in Table 1 were mixed at 40, 50 and 10 wt %, respectively, and melt extruded from a T-die at 280° C., followed by rapid cooling on chill rolls, to give an unstretched film. The unstretched film had a Tg of 69° C.

The above unstretched film was pre-heated until the film temperature came to 87° C., and then stretched at a ratio of 5 in the transverse direction with a tenter at 83° C. to give a heat-shrinkable polyester film of 50 μm in thickness.

Comparative Example 5

A heat-shrinkable polyester film of 50 μm in thickness was obtained in the same manner as described in Example 1, except that the stretch ratio was changed to 4.0.

Comparative Example 6

A heat-shrinkable polyester film of 50 μm in thickness was obtained in the same manner as described in Example 1, except that the stretching temperature was changed to 81° C.

Comparative Example 7

A heat-shrinkable polyester film of 50 μm in thickness was obtained in the same manner as described in Example 1, except that the air flow rate from the nozzle in the pre-heating was set to 11 m/sec.

The results of evaluation for the films obtained in Examples 1–5 and Comparative Examples 1–7 are shown in Table 2. As can be seen from Table 2, all the films obtained in Examples 1–5 exhibited good shrinkage finish and had good thickness distribution. This indicates that the heat-shrinkable polyester films of the present invention have high quality and high practical availability, and therefore, they are particularly suitable for shrinkable labels.

On the other hand, the heat-shrinkable film obtained in Comparative Example 1 had deteriorated thickness distribution. All the heat-shrinkable films obtained in Comparative Examples 1, 3, 4, 5, 6 and 7 exhibited poor shrinkage finish with occurrence of wrinkles and insufficient shrinkage by heat shrinkage. Thus all the heat-shrinkable polyester films obtained in Comparative Examples had low quality and low practical availability.

TABLE 1

| | Raw materials (wt %) | | | | | | Conditions for film formation | | |
| | | | | | Film Tg | Stretch ratio | Stretching temperature | Preheating air flow rate |
| | Polyester A | Polyester B | Polyester C | Polyester D | (° C.) | (times) | (° C.) | (m/sec.) |
|---|---|---|---|---|---|---|---|---|
| Example 1 | 15 | 65 | 20 | — | 60 | 5.0 | 65 | 14 |
| Example 2 | 15 | 70 | 15 | — | 63 | 5.0 | 69 | 14 |
| Example 3 | 15 | 75 | 10 | — | 65 | 5.0 | 72 | 14 |
| Example 4 | 15 | 75 | — | 10 | 69 | 5.0 | 83 | 14 |
| Example 5 | 10 | 80 | 10 | — | 71 | 5.0 | 72 | 14 |
| Comp. Ex. 1 | 15 | 75 | 10 | — | 63 | 5.0 | 75 | 14 |
| Comp. Ex. 2 | 15 | 65 | 20 | — | 60 | 5.0 | 55 | 11 |
| Comp. Ex. 3 | 10 | 60 | 30 | — | 52 | 5.0 | 61 | 14 |

TABLE 1-continued

|  | Raw materials (wt %) | | | | Film Tg (° C.) | Conditions for film formation | | |
|---|---|---|---|---|---|---|---|---|
|  | Polyester A | Polyester B | Polyester C | Polyester D |  | Stretch ratio (times) | Stretching temperature (° C.) | Preheating air flow rate (m/sec.) |
| Comp. Ex. 4 | 40 | 50 | — | 10 | 69 | 5.0 | 83 | 11 |
| Comp. Ex. 5 | 15 | 65 | 20 | — | 60 | 4.0 | 65 | 11 |
| Comp. Ex. 6 | 15 | 65 | 20 | — | 60 | 5.0 | 81 | 11 |
| Comp. Ex. 7 | 15 | 75 | 10 | — | 65 | 5.0 | 65 | 11 |

Polyester A: TPA//EG = 100//100 (mol %)
Polyester B: TPA//EG/NPG = 100//70/30 (mol %)
Polyester C: polyester D//ε-caprolactone = 70//30 (wt %)
Polyester D: TPA//BD = 100//100 (mol %)

TABLE 2

|  | Heat shrinkability (%) | | | Film haze (%) | ΔHS (%) | Shrinkage stress (MPa) | Shrinkage finish | Thickness distribution |
|---|---|---|---|---|---|---|---|---|
|  | TD | | MD | | | | | |
|  | 70° C. | 85° C. | 85° C. | | | | | |
| Example 1 | 47 | 68 | −4 | 6 | 25 | 9 | good | good |
| Example 2 | 41 | 69 | −6 | 7 | 37 | 11 | good | good |
| Example 3 | 29 | 70 | −6 | 8 | 53 | 12 | good | good |
| Example 4 | 15 | 68 | −5 | 7 | 58 | 11 | good | good |
| Example 5 | 29 | 70 | −6 | 7 | 54 | 11 | good | good |
| Comp. Ex. 1 | 30 | 61 | −1 | 6 | 49 | 7 | poor | poor |
| Comp. Ex. 2 | — | — | — | 18 | — | — | — | — |
| Comp. Ex. 3 | 52 | 63 | 1 | 6 | 15 | 6 | poor | fair |
| Comp. Ex. 4 | 24 | 63 | 3 | 7 | 58 | 8 | poor | good |
| Comp. Ex. 5 | 42 | 63 | −3 | 5 | 29 | 6 | poor | fair |
| Comp. Ex. 6 | 17 | 59 | −1 | 5 | 67 | 7 | poor | poor |
| Comp. Ex. 7 | 49 | 71 | −1 | 13 | 51 | 15 | good | good |

According to the present invention, heat-shrinkable polyester films suitable for full labels on bottles, particularly for full labels on PET bottles.

The heat-shrinkable polyester films of the present invention can exhibit good finish with only rare occurrence of wrinkles, shrinkage spots, strains and insufficient shrinkage by heat shrinkage when used as full labels on bottles. Therefore, the heat-shrinkable polyester films of the present invention are very useful as full bottle labels having excellent printability.

What is claimed is:

1. A heat-shrinkable polyester film comprising a polyester elastomer and having a heat shrinkability of 5–60% after treatment in hot water at 70° C. for 5 seconds and 65–95% after treatment in hot water at 85° C. for 5 seconds, both in the main shrinkage direction of the film, and 10% or lower after treatment in hot water at 85° C. for 5 seconds in a direction perpendicular to the main shrinkage direction of the film, the heat-shrinkage stress in the main shrinkage direction of the film being 13 MPa or smaller, and the film haze being lower than 10%.

2. A heat-shrinkable polyester film according to claim 1, wherein the polyester elastomer is incorporated in an amount of 5% or more.

3. A heat-shrinkable polyester film according to claim 1, wherein the film has a thickness distribution of 6% or lower.

4. A label made of a heat-shrinkable polyester film according to claim 1.

* * * * *